(12) United States Patent
Bergonnier et al.

(10) Patent No.: US 11,352,146 B2
(45) Date of Patent: Jun. 7, 2022

(54) GAS SUPPLY ASSEMBLY FOR AIRCRAFT DOOR ACTUATOR AND EVACUATION SYSTEM

(71) Applicant: Ratier Figeas SAS, Figeac (FR)

(72) Inventors: Hélène Bergonnier, Figeac (FR); Bruno Seminel, Figeac (FR)

(73) Assignee: RATIER FIGEAC SAS, Figeac (FR)

( * ) Notice: Subject to any disclaimer, the term of this patent is extended or adjusted under 35 U.S.C. 154(b) by 373 days.

(21) Appl. No.: 16/527,979

(22) Filed: Jul. 31, 2019

(65) Prior Publication Data

US 2020/0148370 A1    May 14, 2020

(30) Foreign Application Priority Data

Nov. 13, 2018 (EP) ..................... 18306484

(51) Int. Cl.
*B64D 25/14* (2006.01)
*E05F 15/50* (2015.01)
*B64D 25/18* (2006.01)
*B64C 1/14* (2006.01)

(52) U.S. Cl.
CPC ............... *B64D 25/14* (2013.01); *B64C 1/14* (2013.01); *B64C 1/1407* (2013.01); *B64D 25/18* (2013.01); *E05F 15/50* (2015.01); *B64C 1/1423* (2013.01); *E05Y 2900/502* (2013.01); *E05Y 2900/531* (2013.01)

(58) Field of Classification Search
CPC .......... B64D 25/14; B64D 25/18; B64C 1/14; B64C 1/1407; B64C 1/1423
See application file for complete search history.

(56) References Cited

U.S. PATENT DOCUMENTS

| 4,717,096 A * | 1/1988 | Labarre ................... A62B 1/20 |
| | | 114/375 |
| 5,102,070 A | 4/1992 | Smialowicz et al. |
| 6,786,454 B2 * | 9/2004 | Baderspach .......... B64C 1/1407 |
| | | 244/129.5 |
| 2006/0010769 A1 * | 1/2006 | Pelz ....................... B64C 1/1423 |
| | | 49/141 |
| 2007/0202759 A1 * | 8/2007 | Bermal ............... E05B 47/0038 |
| | | 441/42 |

FOREIGN PATENT DOCUMENTS

| EP | 0208570 A1 | 1/1987 |
| EP | 1418121 A1 | 5/2004 |

OTHER PUBLICATIONS

Extended European Search Report for International Application No. 18306484.9 dated May 28, 2019, 8 pages.

* cited by examiner

*Primary Examiner* — Tye William Abell
(74) *Attorney, Agent, or Firm* — Cantor Colburn LLP

(57) ABSTRACT

A gas distribution assembly for providing gas to an actuator for opening an aircraft door and to an aircraft evacuation slide, the assembly comprising a single common gas supply and valve means for controlling distribution of gas from the common supply between the slide and the door actuator based on door opening position.

10 Claims, 3 Drawing Sheets

GAS SUPPLY ASSEMBLY FOR AIRCRAFT DOOR ACTUATOR AND EVACUATION SYSTEM

FOREIGN PRIORITY

This application claims priority to European Patent Application No. 18306484.9 filed Nov. 13, 2018, the entire contents of which is incorporated herein by reference.

TECHNICAL FIELD

The invention relates to the field of gas reservoirs for providing pressurised gas to open an aircraft door and to actuate an inflatable escape aid such as a slide or raft in an aircraft emergency situation. While we specifically mention slides below, the description also applies to rafts or other inflatable escape aids.

BACKGROUND

In an aircraft emergency it may be necessary to quickly evacuate passengers. This is usually done by means of an escape slide or raft. The slide or raft is inflatable and, during normal situations, is stored in a deflated packed state in or near the passenger and/or emergency exit doors.

Before take-off, a flight attendant performs a slide arming operation by attaching the slide to the door by means of a metal bar or lanyard. During flight, the door is 'armed', which means that it is connected to the slide by e.g. the metal bar. In an emergency evacuation, the door will be opened by means of an actuator which is operated by means of pressurised gas stored in a gas reservoir. Opening the door pulls the bar so that the slide is released. As the slide is released and drops out of the door, the slide is inflated from a reservoir of pressurised gas stored in the aircraft either in the slide/raft or in association with the slide. The reservoir may be a cylinder stored in or near the aircraft door and in gas flow connection via a release valve with the slide/raft. Alternatively, the reservoir may be mounted in the slide/raft itself. The dropping of the slide under its own weight will open a reservoir release valve to release the charged gas into the slide for inflation.

In conventional systems, the door actuator assembly includes a dedicated high pressure gas reservoir for the door actuator. The actuator may be combined with a damper which controls door opening speed. This ensures correct slide deployment. The slide assembly also includes a dedicated reservoir containing pressurised gas to inflate the slide.

Weight, size and cost are important considerations for components and devices built on or into aircraft. All parts should be as light and small as possible whilst maximising safety and reliability. In-flight maintenance requirements should also be minimised to the extent possible.

The use of two separate gas cylinders for the emergency exit door and slide operation requires space for the two cylinders in the aircraft. Each cylinder also has an associated safety risk as it contains pressurised gas which can explode if subjected to excessive impact and/or temperatures and pressures. For each cylinder, regular pressure checks and maintenance need to be carried out.

Also, because automatic inflating of the slide requires operation to "arm" the system (by a flight attendant before take-off), there is a human error risk.

The inventors have, therefore, identified a need for a smaller, more compact and safer gas reservoir assembly, whilst maintaining safety and reliability standards.

SUMMARY

According to one aspect, the present disclosure provides a gas distribution assembly for providing gas to an actuator for opening an aircraft door and to an inflatable aircraft evacuation aid, the assembly comprising a single common gas supply and valve means for controlling distribution of gas from the common supply between the door actuator and the evacuation aid based on the door opening position.

An aircraft evacuation assembly is also provided as defined in claim 13.

The evacuation aid is preferably an inflatable slide or raft.

The valve means preferably switches gas flow from the common gas supply between the door actuator and the slide after the door has opened. The valve means may be triggered to switch either in direct response to the door reaching a predetermined degree of opening, e.g. by means of mechanical actuation means connected between the door and the valve means. Alternatively, the valve means may be triggered by the slide free falling under its own weight out of the opened door.

A pressure regulator may be provided in the gas flow path to regulate gas to the door actuator and/or slide.

A quick disconnect mechanism may be provided between the assembly and the slide so that the door can be opened without releasing the slide.

DETAILED DESCRIPTION

Figure 1B:
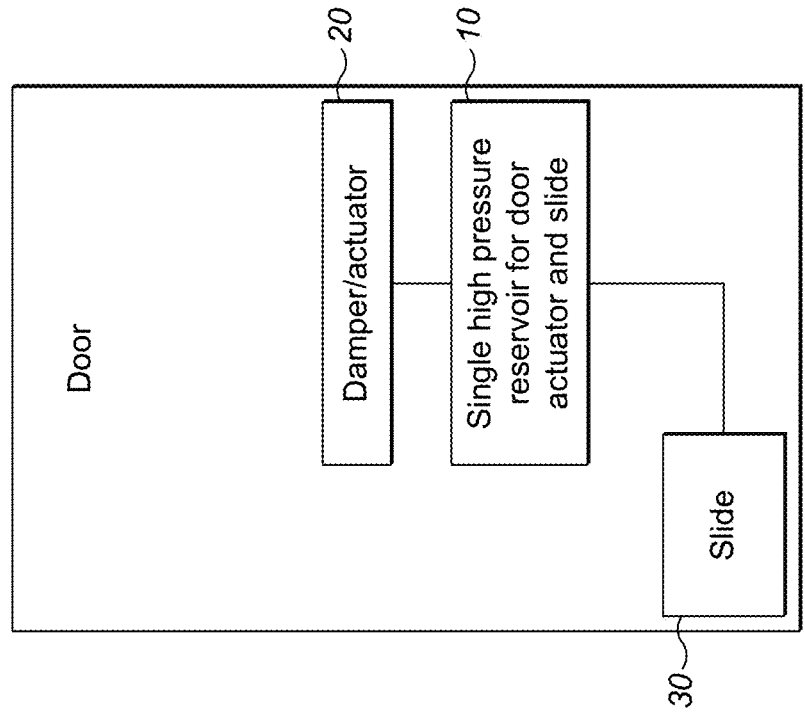
FIGS. 1a and 1b show, in simple schematic form, the essential difference between a conventional arrangement and the arrangement of this disclosure.
Figure 1A:
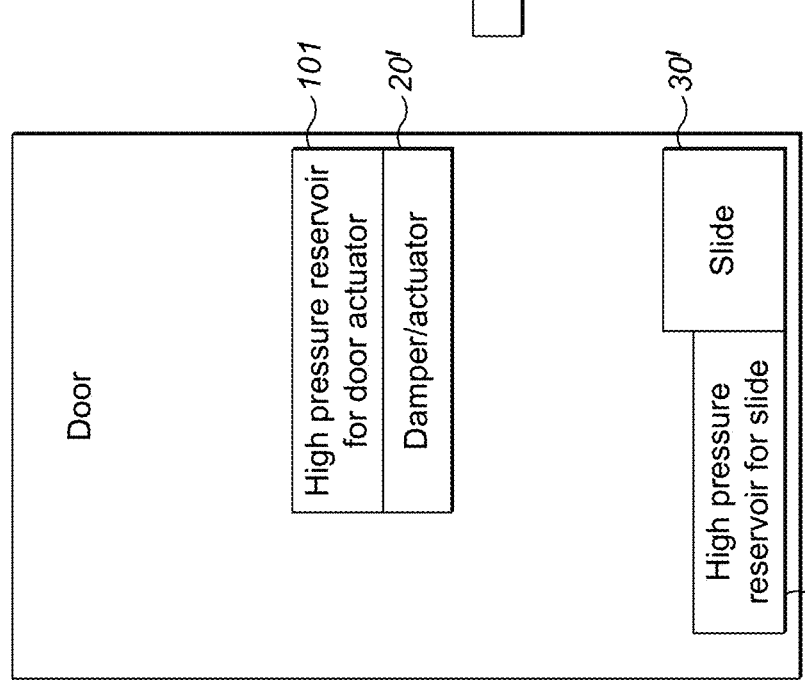

Referring first to FIG. 1a, as mentioned above, conventional evacuation systems have a door assembly including a door damper 20' and actuator with a dedicated high pressure reservoir 101. An evacuation slide 30' mounted in the aircraft, e.g. in the door cavity or just below the door, is also provided with its own dedicated high pressure reservoir 102 used to inflate the slide.

In the assembly of the present disclosure, shown in FIG. 1b, a single common gas reservoir 10 is provided for both the door damper/actuator 20 and the slide 30.

This saves weight and space and also means that there is only one reservoir to be maintained, to check the pressure of, and to refill after use.

Figure 2:
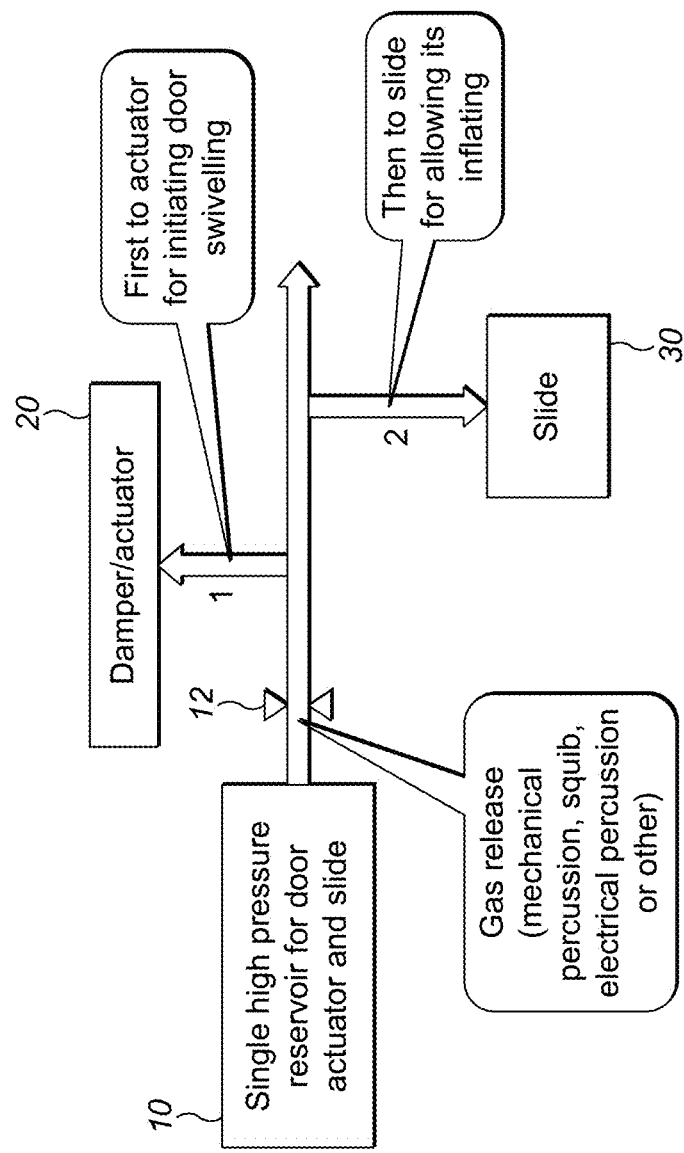
FIG. 2 is a more detailed schematic view of a gas distribution assembly according to this disclosure.

The principle of the control of gas distribution from the common reservoir to the door actuator and to the slide in an emergency situation is described below with specific reference to FIG. 2.

The common gas reservoir 10 is connected via gas flow channels 1,2 to the door actuator 20 and to the slide 30. In an emergency situation, the gas is released from the reservoir. This can be done in various known ways, e.g. by means of a release valve 12 opened by means of a trigger, lanyard, pin or the like, by rupture of a membrane, etc. Other known types of release valve include mechanical percussion valves, squib valves, electrical percussion valves, etc.

On release of the gas, it will first flow to the door actuator to cause the door to open. A control mechanism (discussed further below) will control subsequent flow of the gas to the slide to inflate the slide.

The control mechanism will be described in more detail with reference to FIG. 3.

As mentioned above, the reservoir 10 is connected to the door actuator 20 via fluid flow channel 1 and to the slide 30 via fluid flow channel 2. A flow regulation mechanism (here 16, 17, 18) controls the distribution of the gas from the reservoir 10 to the door actuator 20 or to the slide 30.

Figure 3:
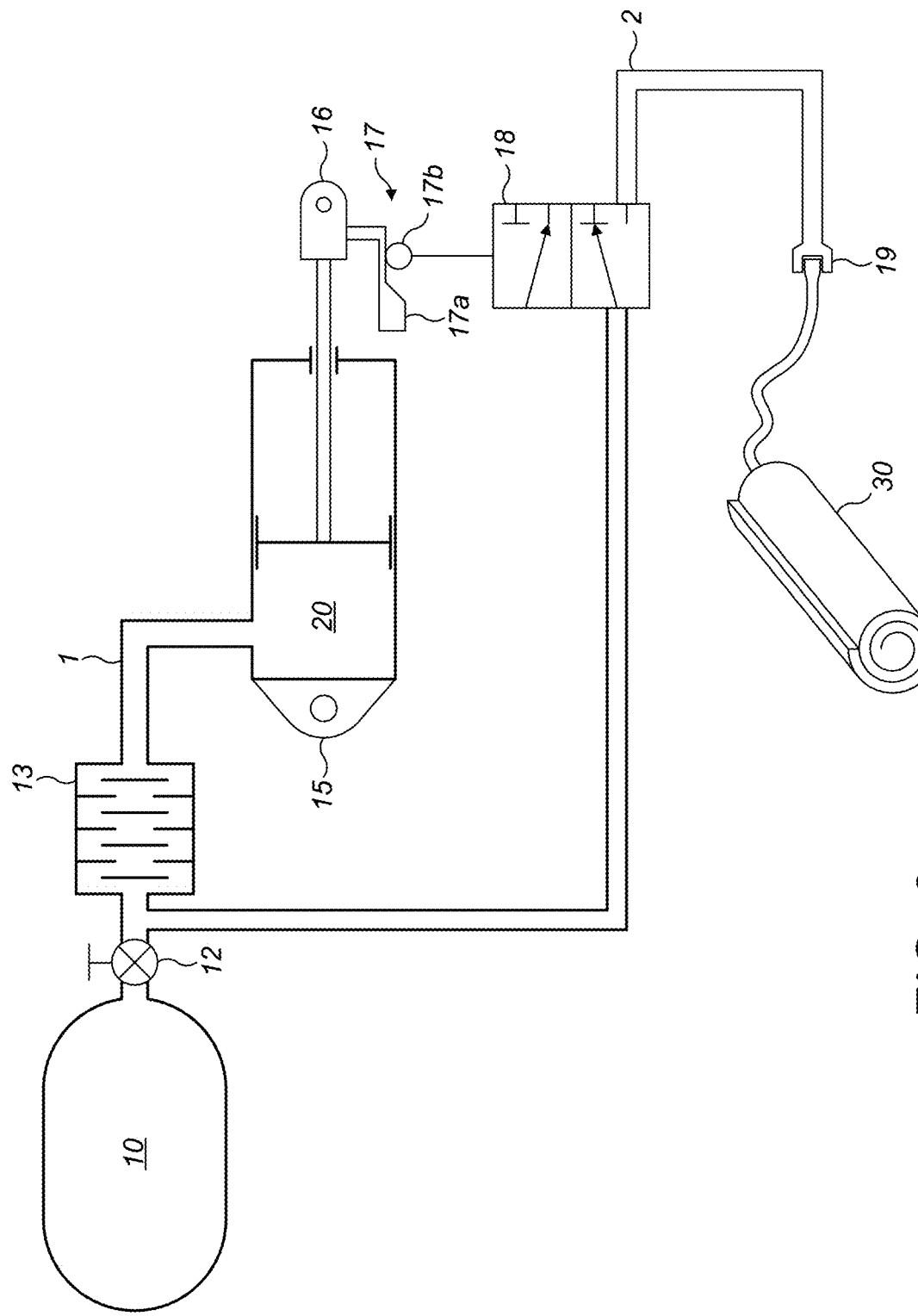
FIG. 3 is a more detailed schematic view of a preferred assembly according to this disclosure.

In the embodiment shown in FIG. 3, the gas distribution is regulated by a valve mechanism 18 located between the reservoir 10 and the slide 30. Initially, this valve mechanism 18 is in a closed state so that gas from the reservoir 10, released when the release valve 12 is opened, can only flow to the door actuator 20 via flow channel 1 because flow through the valve mechanism 18 to the slide is blocked.

Responsive to an emergency operation causing opening of the door, either fully or to a predetermined extent according to the application, the valve mechanism 18 is moved to an open state whereby gas from the reservoir 10 is able to flow through the valve mechanism 18 into fluid channel 2 and into the slide 30 to inflate the slide.

Most preferably, the valve mechanism 18 is in mechanical connection with the door actuator and is configured to move to the open state in response to the door actuator reaching a certain extent of opening. This may be by means of a direct mechanical attachment or indirectly via a form of mechanical regulator.

In the embodiment shown, for example, the door actuator has one end attached to the aircraft fuselage (not shown) by means of an attachment means 15. The other end of the actuator 20 is attached to door linkages 16 that cause the door to open (not shown). In this embodiment, a valve actuation member 17 is connected to the actuator and is configured such that when the actuator reaches a given open position it mechanically causes the valve mechanism to 'trip' to the open state.

In one example, the valve actuation member 17 could be a cam and roller assembly, the cam 17a moving with the actuator relative to a roller 17b that is positioned in surface contact with the cam 17a and is associated with the valve mechanism 18. As the cam 17a reaches and abuts the roller 17b due to the actuator having reached the predetermined open position, the cam 17a pushes the roller 17b which causes the valve mechanism 18 to trip to open. Other forms of valve actuation member 17 can also be envisaged which could be based e.g. on the time since gas was released from the reservoir or the like. What is important is that the actuator reaching a given position causes the valve mechanism 18 to open so as to release gas into the slide 30. The given position may be the angle of door opening and/or actuator stroke or some other mechanical positioning of the door and/or actuator.

In another embodiment, the valve mechanism 18 is in connection with the slide itself such that the free fall of the slide pack out of the open door triggers switching of the valve mechanism 18 to the open state.

Alternatively, the valve mechanism 18 could be switched based on a timer.

The general concept is that, in a first part of the evacuation procedure, the gas from the reservoir is directed to the door actuator and, subsequently, the valve mechanism is triggered to direct the gas to inflate the slide as it falls out of the door.

In a preferred arrangement, a gas pressure regulator 13 may be provided in one or both of the fluid flow channels (shown here in channel 1) to monitor the pressure of gas flowing to the door actuator/slide to avoid over-pressure and/or detect under-pressure that may be due to leaks etc.

To allow the slide 30 to be easily disarmed, e.g. when the aircraft is on the water and the slide should be used as a raft, a quick disconnect device 19 may be provided in the flow channel 2.

The sequence of gas distribution between the door actuator and the slide will be adapted to door kinematics to ensure correct and optimised emergency door opening.

The type of and/or nature of the gas or gas mixture in the reservoir can be selected for optimised performance. Nitrogen and Co2 are commonly used, but other gases/gas mixtures can also be used.

Similarly, the pressure, volume and temperature will be selected to ensure sufficient energy for door opening and slide release/inflation even under adverse loads.

Whilst the embodiment currently envisaged will store pressurised gas in the reservoir, an alternative solution may be to have a 'reservoir' in the form of a gas generator which only generates the pressurised gas when it is required for emergency door opening/slide release.

In conventional systems, if the door is opened manually in a non-emergency exit situation, and the slide is accidentally still 'armed', i.e. connected to the door, the slide will release/inflate because it opens its own reservoir in response to the door opening action. A particular advantage of the present assembly is that in a non-emergency situation, because the door is not controlled by the actuator using pressurised gas, the gas reservoir is not open so no gas will flow to the slide.

Unlike with conventional systems where the door has to be "armed"—i.e. connected to the slide manually, there is no risk of human error preventing automatic inflation of the slide in an emergency.

The invention claimed is:

1. An aircraft evacuation system, comprising:
   an aircraft door,
   a door actuator,
   an inflatable evaluation aid arranged to be released when the door opens in an emergency, and
   a gas distribution assembly system connected to the inflatable evacuation aid, the assembly system comprising:
   a single common gas supply; and
   a valve mechanism for controlling distribution of gas from the common supply between the door actuator and the inflatable evacuation aid based on the door opening position;
   wherein the valve mechanism is configured to direct gas to flow from the gas supply to the door actuator to open the door in a first phase and to subsequently direct gas to flow from the gas supply to the inflatable evacuation aid in a second phase, to inflate the inflatable evacuation aid; and
   wherein the valve mechanism directs gas to flow to the inflatable evacuation aid in response to the door reaching a predetermined angle of opening.

2. The aircraft evacuation system of claim 1, further comprising a pressure regulator to regulate gas flow.

3. The aircraft evacuation system of claim 1, wherein the gas supply comprises a cylinder of pressurised gas.

4. The aircraft evacuation system of claim 1, wherein the gas supply comprises a gas generator.

5. The aircraft evacuation system of claim 1, further comprising a quick disconnect mechanism for releasably connecting the evacuation aid to the assembly.

6. The aircraft evacuation system of claim 1, further comprising a release valve at an outlet of the common supply.

7. The aircraft evacuation system of claim 1, wherein the inflatable evacuation aid is a slide or a raft.

8. The aircraft evacuation system of claim 1, further comprising a flow regulation mechanism, wherein the valve mechanism is part of the flow regulation mechanism, and wherein the flow regulation mechanism further comprises a valve switching mechanism attached to the door.

9. The aircraft evacuation system of claim 8, wherein the valve switching mechanism includes a valve actuation member attached to the door and to a mechanical component such that movement of the door causes responsive movement of the mechanical component, which in turn opens the valve.

10. The aircraft evacuation system of claim 9, wherein the mechanical component includes a cam moveably attached to the door and a roller actuably responsive to contact with the cam to open the valve mechanism.

\* \* \* \* \*